Figure 1:
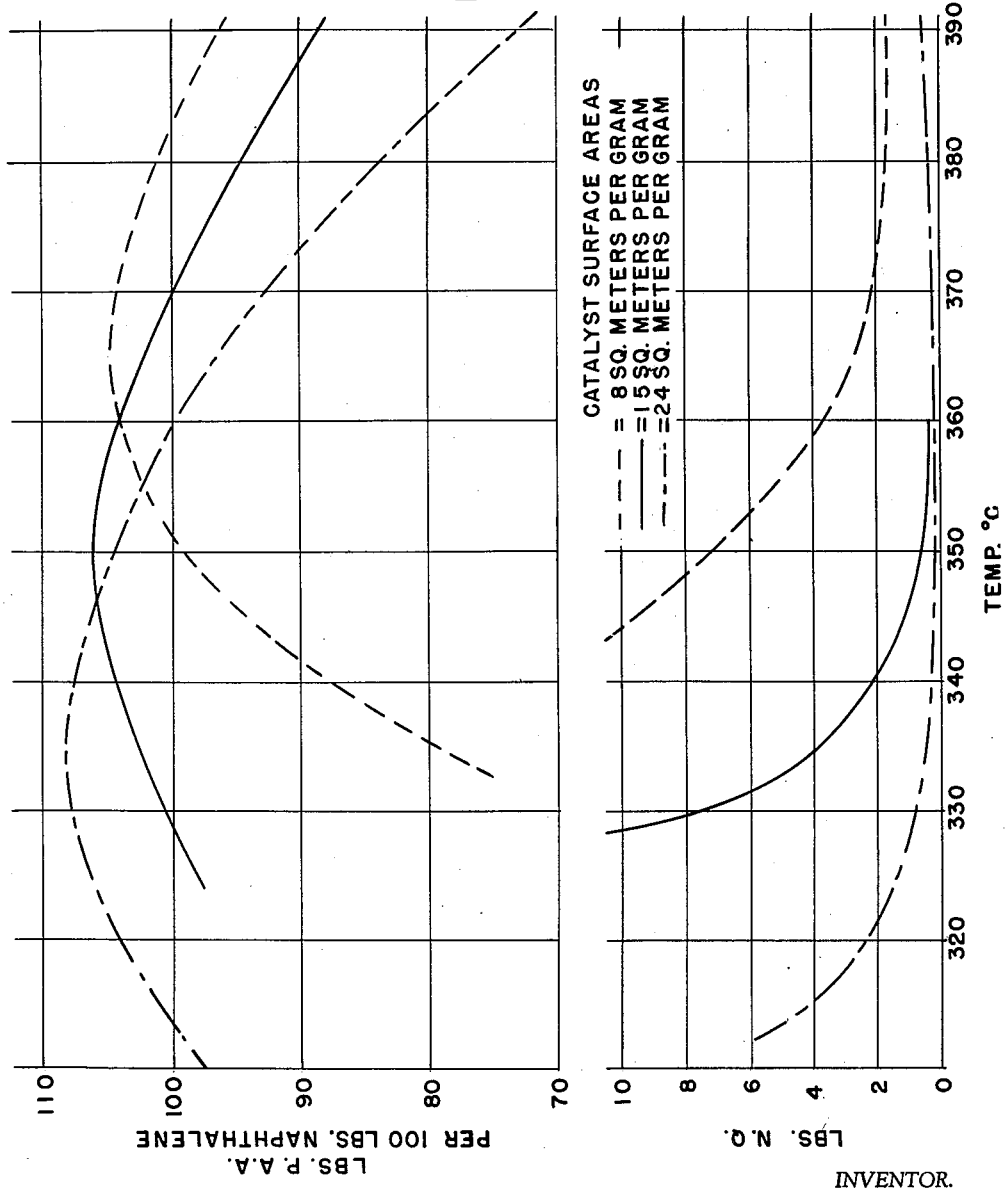

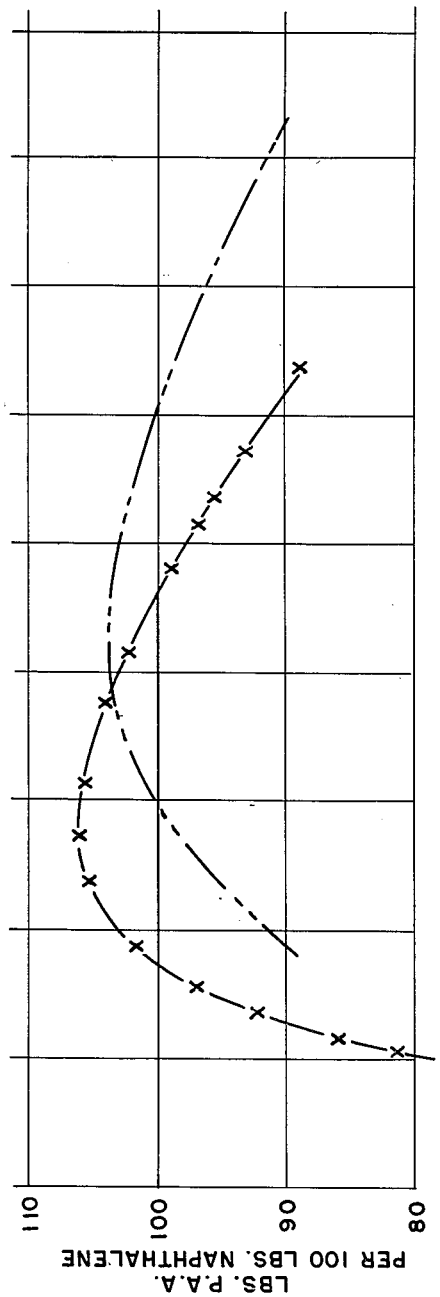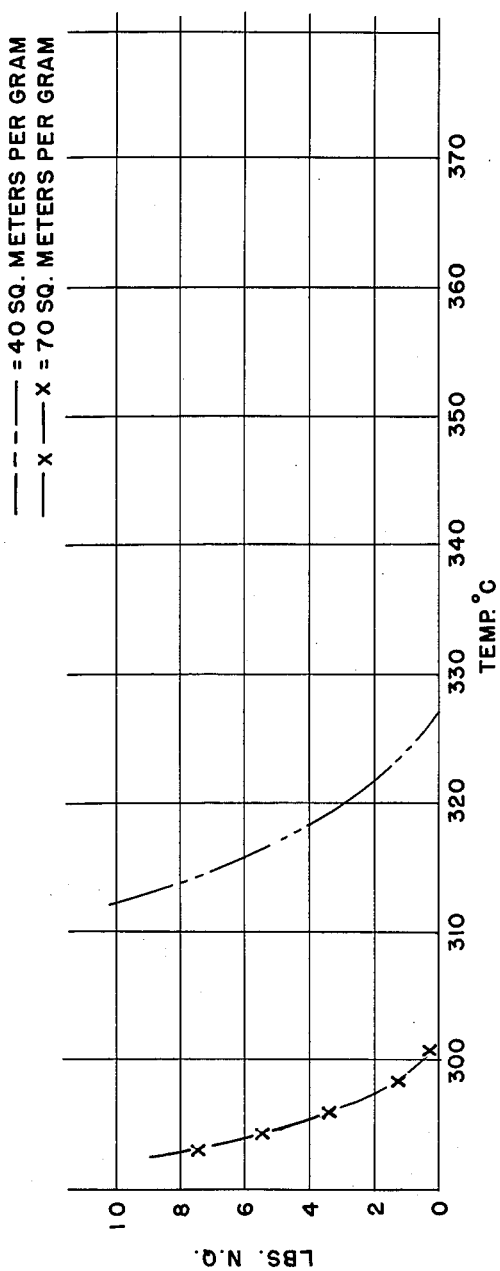
FIG. 2

United States Patent Office 2,973,371
Patented Feb. 28, 1961

2,973,371

PHTHALIC ANHYDRIDE CATALYSTS OF HIGH SURFACE AREA

Nicholas Chomitz, Yonkers, and William R. Rathjens, Hollis, N.Y., assignors to American Cyanamid Company, New York, N.Y., a corporation of Maine Filed Nov. 20, 1957, Ser. No. 697,739

10 Claims. (Cl. 260—346.4)

This invention relates to improvements in vanadium oxide-containing catalysts of the type used in the vapor phase fluid bed catalytic oxidation of naphthalene to phthalic anhydride, and more particularly to silica-vanadium oxide-potassium sulfate catalysts characterized by a high surface area and a correspondingly increased activity in the conversion of naphthalene to phthalic anhydride. The invention includes the improved catalysts themselves, methods for their production, and the vapor phase oxidation of naphthalene to phthalic anhydride in the presence thereof.

Experience has shown that the most suitable catalysts for use in the vapor phase oxidation of naphthalene to phthalic anhydride by the fluidized catalyst bed technique are those which contain a heat-hardened gel of silica impregnated with a mixture of vanadium oxide and a potassium sulfate, with or without the incorporation of minor quantities of a promoting metal oxide such as silver oxide, cerium oxide, aluminum oxide and the like. Catalysts of this type are described in U.S. Patent No. 2,698,330, dated December 28, 1954. Our present invention is directed to improvements in the catalysts described in this patent which increase their effectiveness in the production of phthalic anhydride from naphthalene by permitting operation at decreased converter temperatures or with higher naphthalene loadings, or both.

The principal object of our present invention is therefore the provision of fluidizable silica-vanadium oxide-potassium sulfate catalysts having increased activity and selectivity for the production of phthalic anhydride from naphthalene, as compared with those previously known. A further object is the provision of a manufacturing process for such improved catalysts that can readily be carried out on a commercial scale. Other objects of the invention will become apparent from the following descriptions of preferred embodiments thereof.

Our invention is based on the discovery that the activity and selectivity of vanadium oxide-potassium sulfate catalysts having silica gel carriers can be materially improved by increasing the surface areas thereof. In particular, we found that by providing finely divided silica-vanadium oxide-potassium sulfate catalysts having a surface area of about 20 square meters per gram or greater, improved performance is obtainable. Our experiments have shown that impregnated silica catalysts of this type having surface areas within the range of about 40–75 square meters per gram are obtainable, and these constitute the preferred catalysts of our invention.

Our new catalysts are capable of attaining their maximum activity at lower converter temperatures than those having smaller surface areas. By reason of their greater activity they can be operated at higher naphthalene loadings while producing good yields of phthalic anhydride of good purity. They are therefore well suited for use at converter temperatures within the range of about 325°–425° C. with naphthalene-air mixtures containing from 1 to about 3.5 mol percent of naphthalene; i.e., from 1 to 3.5 mols of naphthalene in 99 to 96.5 mols of air. The increased activity and selectivity of our improved catalysts are shown graphically on the attached drawings, wherein:

Fig. 1 shows the performance curves of silica-vanadium oxide-potassium sulfate catalysts having surface areas of about 8, 15 and 24 square meters per gram, and Fig. 2 shows the performance of similar catalysts having higher surface areas of about 40 and 70 square meters per gram.

These drawings will be further explained after describing the preparation of the catalysts employed.

The high surface area catalysts of our invention are obtained by controlling the surface area of the silica gel carrier within the range of about 200–700 square meters per gram while simultaneously providing an average pore diameter of at least 50 Angstrom units. We have found that silica gel carriers having these characteristics, when impregnated uniformly with the proper quantities of vanadium oxide and potassium sulfate, will yield finished catalysts which, in their freshly prepared condition, possess a surface area of at least 20 square meters per gram and a correspondingly high activity.

Catalysts included within the scope of our invention can be obtained by first preparing a heat-set silica gel having a surface area and pore diameter within the ranges indicated above and impregnating it uniformly with about 5–20% of one or more vanadium oxides and about 20–50% of a potassium sulfate such as $K_2SO_4$, $KHSO_4$, $K_2S_2O_7$ and the like, based on the weight of the catalyst, as by repeatedly soaking the silica gel in an aqueous solution containing potassium or ammonium metavanadate and the potassium sulfate followed by drying. We have found, however, as one of the most important process features of our invention, that silica gels having the indicated combination of surface area and pore diameter characteristics can be produced by a modification of the process described in the patent referred to above. This is accomplished by bringing about gelation or conversion of the silica into a hydrogel after reacting ammonium vanadate with an aqueous potassium silicate solution. By aging the resulting mixture until the hydrated silica liberated by the reaction is converted into a hydrogel we obtain the formation of a type of gelatinous silica capable of heat hardening to a heat-set gel or xerogel having the desired surface area of 200–700 square meters per gram and a pore diameter of at least 50 A. and usually within the range of 50–250 A.

We have also found, as a feature of great practical importance in the process of our invention, that increases in the surface area of the finished catalyst are obtained by increasing the temperature at which the gelation occurs. Thus, catalysts having surface areas within the range of 20–40 square meters per gram are obtainable when ammonium vanadate is added to an aqueous potassium silicate solution and the liberated silica is gelled at temperatures of 100°–120° F., whereas surface areas up to 65–75 square meters per gram are obtainable by further increasing the temperature of the reaction and gel formation to a maximum of about 200° F. Our experiments have shown that the surface areas of the catalysts can be still further controlled by so regulating the concentration of the aqueous potassium silicate solution as to carry out the silica hydrogel formation at selected silica contents within the range of about 2.5% to 7.5%.

In producing catalysts by the preferred process of our invention an aqueous potassium silicate solution having a suitable concentration and temperature is therefore first prepared and a quantity of ammonium vanadate such as to incorporate from about 5% to 20% of $V_2O_5$ into the catalyst is added. We then age the mixture of reaction products until the hydrated silica liberated by the reaction is converted into a hydrogel. Sulfuric acid is then added in a quantity sufficient to obtain the desired $SO_3:K_2O$ ratio in the finished catalyst, which is usually about 2:1, accompanied or followed by the addition of sufficient ammonia to maintain or adjust the final pH of the batch to a value within the range of about 4–9.

The aging time required to convert into a hydrogel the silica liberated by reaction between the ammonium vanadate and the potassium silicate solution may vary with the temperature and solids content of the batch, but is ordinarily within from about 15 minutes to 1 hour. Usually the beginning of gelation can be noted by the formation of small particles of silica hydrogel in the batch within 5 to 15 minutes after addition of the ammonium vanadate is complete; upon further aging the gelation continues until substantially all of the liberated silica has polymerized to a hydrogel. If desired, the quantity of silica hydrogel can be increased by adding an ammonium salt such as ammonium sulfate along with or immediately after the ammonium vanadate addition. This may be desirable in preparing catalysts having a low $V_2O_5$ content, but is usually unnecessary.

The reaction is believed to be as follows:

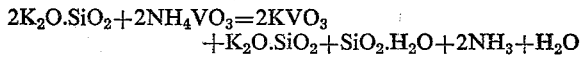

and the amount of silica liberated is therefore dependent on the ratio of ammonium vanadate to $K_2O$ in the potassium silicate solution. In most commercial potassium silicate solutions the ratio of $K_2O$ to $SiO_2$ is usually about 1:4, and therefore about 90% of the silica is released by the quantities given in the above equation. We have found, however, that catalysts of high surface area are obtainable when considerably smaller proportions of the total amount of silica are liberated by this reaction, provided sufficient aging time is allowed for substantially all of the liberated silica to form a hydrogel.

After the hydrogel formation is complete, and after the addition of the requisite quantities of sulfuric acid and ammonia, the batch is preferably given a second aging to improve the attrition resistance and other physical properties of the catalyst. The time of this final aging step is preferably about 1–2 hours, but may be as long as 15–18 hours if desired. The batch is then evaporated to dryness to produce the final catalyst composition.

Tray drying in an oven followed by grinding may be used if desired but spray drying is preferably employed, since the fluidization and attrition resistance of a spray dried microspheroidal catalyst are considerably better than those of a ground tray-dried catalyst of the same average particle size. Spray drying is preferably carried out on an aged slurry which has been homogenized by pumping it through a spring pressed homogenizing valve operating at a pressure drop of about 1000 lbs. per square inch. The homogenized slurry is sprayed into a current of hot drying gases having an inlet temperature of about 600°–1200° F. and dried to a moisture content, as determined by loss on ignition, of about 5–25%.

It will be understood that the catalysts of our invention ordinarily contain about 40% to 75% by weight of silica which is impregnated with about 20% to 50% of a potassium sulfate, usually potassium pyrosulfate having an $SO_3:K_2O$ ratio of about 2:1, in addition to a content of about 5–20% of oxides of vanadium expressed as $V_2O_5$. Prior catalysts of this composition have had low pore volumes within the range of about 0.01–0.1 cc. per gram. In addition to their greater surface area, the catalysts of corresponding vanadium oxide and potassium sulfate content impregnated into silica carriers having surface areas of about 200–700 square meters per gram and pore diameters of at least 50 A. have considerably higher pore volumes within the range of 0.15–0.35 cc. per gram or higher. The surface areas and pore volumes referred to herein are those of the freshly prepared catalyst before it has been used in the production of phthalic anhydride, for it is known that both the surface area and the pore volume of such catalysts change with a partial reduction of the vanadium pentoxide to vanadium tetroxide which may occur when the catalyst is contacted with naphthalene-air mixtures at reaction temperatures.

Our invention also includes catalytic oxidation processes in which a mixture of naphthalene with air or other oxidizing gas is contacted with a fluidized bed of our improved catalyst of high surface area at reaction temperatures. Representative catalysts of our invention having surface areas within the range of 20–70 square meters per gram have been utilized in a full-scale plant for phthalic anhydride manufacture containing a converter of the type described in U.S. Patent No. 2,783,249, dated February 26, 1957, and have produced excellent yields of a phthalic anhydride converter product of good purity at operating temperatures within the range of 330°–400° C. using naphthalene concentrations of from 1 to 1.5 mol percent in air. In laboratory tests naphthalene concentrations as high as 3.5 mol percent have been used.

The invention will be further described and illustrated by the following specific examples, which include a description of the experimental results shown on the attached drawings. It will be understood, however, that our invention in its broader aspects is not limited by these specific examples, but that modifications and substitutions may be resorted to within the scope of the appended claims.

Example 1

A reaction vessel equipped with an agitator is charged with 2640 lbs. of water and 1300 lbs. of a potassium silicate solution containing 7.8% $K_2O$, 19.5% $SiO_2$ and 72.4% water at a temperature of 100° F. To this there is added with agitation 80 lbs. of powdered ammonium metavanadate followed immediately by the addition of 861 lbs. of 25% sulfuric acid while maintaining the temperature at 100° F. Sufficient ammonia (about 213 lbs.) is then added to raise the pH to 8–9 and the batch is aged for one hour and 45 minutes at 100° F. It is then pumped through a spring-pressed homogenizing valve set to give a 1000 lbs. per square inch pressure drop into a spray drying chamber where it is sprayed into a stream of drying gases having an inlet temperature of 600°–800° F. A microspheroidal product is obtained having a particle size range of minus 20 microns, 10% maximum; minus 100 mesh, 98% minimum. The catalyst contains about 10% of vanadium as $V_2O_5$ and 41–47% $SiO_2$, the balance being chemically bound water in the silica gel and about 42–45% of potassium pyrosulfate having a mol ratio of $SO_3$ to $K_2O$ between about 1.85:1 and 2.10:1. The surface area of this catalyst is about 8 square meters per gram.

Example 2

The procedure of Example 1 is repeated using the same quantities of reagents but maintaining the temperature at 122°–125° F. instead of 100° F. The surface area of the resulting catalyst is about 15 square meters per gram.

Example 3

The reaction vessel of Example 1 is charged with 2640 lbs. of water and 1300 lbs. of the same potassium silicate solution at 100° F. and 80 lbs. of ammonium metavanadate is added during 10 minutes. When all the $NH_4VO_3$ has been added the batch is allowed to stand at the same temperature (100° F.). After about 10 minutes the formation of particles of a gelatinous hydrated silica polymer is noted and upon continued aging for a total time of about 30–45 minutes the gelation of the silica reaches an equilibrium. The addition of 861 lbs. of 25% sulfuric acid is then started and continued until the pH is within the range of 4–8 after which ammonia is added along with the remainder of the acid at rates such as to maintain a pH within this range.

The batch should be aged at least one hour before spray drying. The aging time at this point is not critical, and may be as long as 18 hours without changing materially the properties of the catalyst. It is then pumped through a homogenizing valve at 1000 p.s.i. pressure drop and spray dried in combustion gases having an inlet temperature of 600°–800° F. The surface area of the resulting catalyst is about 24 square meters per gram.

*Example 4*

A microspheroidal catalyst having a surface area of about 40 square meters per gram is prepared by reacting the same quantities of the same reagents by the procedure of Example 3 but maintaining a temperature of 120° F. instead of 100° F. The batch is aged at a pH of 4–9 for 1.75 hours prior to spray drying.

*Example 5*

A batch of the same catalyst with a surface area of about 70 square meters per gram was made by repeating the procedure of Example 3, using the same quantities of the same reagents, but maintaining a temperature of 125°–150° F. This batch was aged at a pH of 8 for 1.75 hours before spray drying.

*Example 6*

The surface area and activity of the catalyst can be further controlled by adjusting the content of hydrated silica in the batch during its liberation from the potassium silicate and polymerization to form a gel to a selected value within the range of about 2.5% to 7.5% solids; i.e., from 2.5% to 7.5% of $SiO_2$ on the weight of the finished batch.

Spray dried microspheroidal catalysts prepared by the process of Example 3, using the same quantities of reagents but maintaining the water content of the batch during the ammonium metavanadate addition and gel formation to give the silica concentration indicated below, had the following surface areas. In all cases the batch temperature was about 130° F.

Percent silica solids:     Surface area, $M^2$ per gram
2.5 _____ 62
5.0 _____ 72
7.5 _____ 75

From the foregoing examples it will be seen that the critical factor leading to the production of fluidizable silica-vanadium oxide catalysts of high surface area and correspondingly increased activity in the fluid bed oxidation of naphthalene to phthalic anhydride is the formation of a hydrogel from the silica as it is released from solution by the reaction of aqueous potassium silicate with an ammonium salt. In most cases only a part of the silica content of the potassium silicate is liberated by this reaction but we have found that when this portion is converted into a hydrogel by aging prior to the addition of acid a catalyst having a greatly increased surface area is obtained.

Fluidizable silica-vanadium oxide-potassium sulfate catalysts of the type dealt with by the present invention usually contain about 5 to 15 percent of vanadium oxide expressed as $V_2O_5$ and an $SO_3:K_2O$ ratio of about 2:1 on a molar basis. The chemical analyses and physical properties of the catalysts of Examples 1 and 5 are representative, and are as follows:

| | ABD[1] | L.O.I.[2], percent | $K_2O$, percent | $SO_3$, percent | $V_2O_5$, percent | $SO_3:K_2O$ |
|---|---|---|---|---|---|---|
| Example 1 | .85 | 5.5 | 16.0 | 27.8 | 10.5 | 2.04 |
| Example 5 | .68 | 13.6 | 18.4 | 31.1 | 10.6 | 1.99 |

[1] Apparent bulk density (grams per cc.).
[2] Loss on ignition.

*Example 7*

The activity of fluidized vanadium oxide-containing catalysts in the vapor phase catalytic oxidation of naphthalene and their selectivity for the production of phthalic anhydride are measured by comparing their optimum operating temperatures. Activity is measured by the temperature at which the maximum phthalic anhydride yield is obtained with minimum naphthoquinone production. Selectivity is measured by the temperature at which a definite quantity of naphthoquinone (2 pounds per 100 pounds of naphthalene feed, for example) is produced.

The catalysts of Examples 1–5 were evaluated for activity and selectivity in a laboratory converter of the type described in U.S. Patent No. 2,698,330 using the following conditions:

Catalyst bed height _____ 10 feet.
Naphthalene-air ratio ___ 1 mol percent (1:22.3 by wt.).
Gas velocity _____ 1 ft. per second.
Contact time _____ 10 seconds.

In each test a series of runs at different operating temperatures was made and the quantities of phthalic anhydride and naphthoquinone in the converter products were determined.

The results obtained are shown in Figs. 1 and 2 of the drawings. The greatly increased activity and selectivity of the catalysts of high surface area (24–70 square meters per gram) for the production of phthalic anhydride are evident from a comparison of these results. Fig. 1 shows that the catalyst of Example 3 has an activity maximum at about 335° C. with the formation of only 0.2 lb. of naphthoquinone whereas a temperature of 350° C. is necessary to obtain comparable results with the catalyst of Example 2 and about 365° C. with that of Example 1. The corresponding curves of Fig. 2 show that the maximum activity of the catalyst of Example 4 is at about the same temperature as that of Example 3, but with substantially no naphthoquinone formation. The catalyst of Example 5 is most active at about 320° C. and produces naphthoquinone only at very low temperatures.

Samples of the catalysts of Examples 1–5 and of other silica-vanadium oxide-potassium sulfate catalyst prepared by the same process were leached to remove their soluble salts and vanadium compounds and the surface areas and pore volumes of the silica gel carriers were determined. The finely divided catalysts were first agitated several times with a large excess of water to remove water-soluble salts and were then leached free from vanadium by agitating with aqueous 25% sulfuric acid, filtered and washed with water. The remaining silica was washed with water until free from acid and dried by heating at 1100° F.

The surface areas of the resulting silica gels were determined by the method of Brunauer, Emmett and Teller, J.A.C.S. 60, 309 (1938) as modified by Innes, Anal. Chem. 23 759 (1951). Pore volumes were determined from the total liquid nitrogen absorption at near saturation pressure. Pore diameters were calculated by the formula $PD=4V/S \times 10^4$. The relationship of the values so determined to the surface areas of the original catalysts is shown in the following table:

| Surface Area, Sq. Meters per Gram | | Pore Diameter, A. | Pore Volume, cc. per Gram | |
|---|---|---|---|---|
| Silica Carrier | Catalyst | Silica Carrier | Catalyst | Silica Carrier |
| 200–300 | 50–65 | 110–350 | 0.35–0.5 | 1.50 |
| 325–425 | 70–75 | about 73 | 0.24–0.35 | 0.67 |
| 425–600 | 50–65 | about 86 | 0.16–0.26 | 0.93 |
| 600–700 | about 20 | 47–72 | about 0.1 | 0.63 |
| 700–850 | 5–16 | 30–36 | 0.01–0.08 | 0.53 |

These figures indicate the surprising fact that high surface area and activity in the finished catalyst result from a smaller surface area but a higher average pore volume and pore diameter in the silica gel carrier. Thus, the silica gel carriers having surface areas within the range of about 700–200, when impregnated with vanadium oxide and potassium sulfate, produce the more active catalysts having surface areas of 20–75 square meters per gram whereas carriers of higher surface area produce the less active catalysts of Examples 1 and 2. Evidently the pores of silica gels having surface areas higher than about 700 square meters per gram are so small that they become almost completely clogged when the gels are impregnated with potassium sulfate and vanadium oxide; this is also shown by the very low pore volumes of the finished catalysts obtained therefrom.

What we claim is:

1. A catalyst for the vapor phase fluid bed catalytic oxidation of naphthalene to phthalic anhydride comprising about 5–20% by weight of vanadium oxide and 20–50% of a potassium sulfate supported on about 40–75% of a silica gel carrier having a surface area within the range of about 200–700 square meters per gram and a pore diameter of from 50 to about 350 Angstroms, said catalyst having a surface area of from 20 to about 75 square meters per gram.

2. A catalyst for the vapor phase fluid bed catalytic oxidation of naphthalene to phthalic anhydride comprising about 10% by weight of vanadium oxide and 42–45% of a potassium sulfate supported on about 41–47% of a silica gel carrier having a surface area within the range of about 200—700 square meters per gram and a pore diameter of about 50–350 Angstroms, said catalyst having a surface area of about 20–75 square meters per gram.

3. A catalyst for the vapor phase fluid bed catalytic oxidation of naphthalene to phthalic anhydride comprising about 5–20% by weight of vanadium oxide and 20–50% of a potassium sulfate supported on about 40–75% of a silica gel carrier having a surface area within the range of about 200–425 square meters per gram and a pore diameter of about 73–350 Angstroms, said catalyst having a surface area of from 50 to about 75 square meters per gram.

4. A method of producing a catalyst having high activity and selectivity for the production of phthalic anhydride when used as a fluidized bed in the vapor phase catalytic oxidation of naphthalene which comprises adding ammonium vanadate to an aqueous potassium silicate solution, converting hydrated silica liberated by the resulting reaction into a hydrogel by aging the mixture, then adding sufficient sulfuric acid to produce an $SO_3:K_2O$ ratio of about 2:1 and sufficient ammonia to attain a final pH within the range of 4–9 and drying the product.

5. A method according to claim 4 in which the silica content is maintained at a selected value within the range of from 2.5% to 7.5% by weight during the ammonium vanadate addition and hydrogel formation.

6. A method of producing a catalyst having high activity and selectivity for the production of phthalic anhydride when used as a fluidized bed in the vapor phase catalytic oxidation of naphthalene which comprises adding to an aqueous potassium silicate solution a quantity of ammonium vanadate such as to incorporate from 5% to 15% of $V_2O_5$ into the catalyst at a temperature within the range of about 120°–200° F., aging the mixture at a temperature within said range until the resulting hydrated silica is converted into a hydrogel, then adding sufficient sulfuric acid to produce an $SO_3:K_2O$ ratio of about 2:1 and sufficient ammonia to attain a final pH within the range of about 4–9 and drying the product.

7. A method of producing phthalic anhydride which comprises passing a mixture of naphthalene vapor and air in contact with a fluidized catalyst bed maintained at a temperature within the range of about 325°–425° C. and containing a catalyst comprising about 5–20% by weight of vanadium oxide and 20–50% of potassium pyrosulfate supported on about 40–75% of a silica gel carrier having a surface area within the range of about 200–700 square meters per gram and a pore diameter of from 50 to about 350 Angstroms, said catalyst having a surface area of from 20 to about 75 square meters per gram.

8. A method of producing phthalic anhydride which comprises passing a mixture of naphthalene vapor and air in contact with a fluidized catalyst bed maintained at a temperature within the range of about 325°–425° C. and containing a catalyst comprising about 5–20% by weight of vanadium oxide and 20–50% of potassium pyrosulfate supported on about 40–75% of a silica gel carrier having a surface area within the range of about 200–425 square meters per gram and a pore diameter of about 73–350 Angstroms, said catalyst having a surface area of from 50 to about 75 square meters per gram.

9. A method of producing phthalic anhydride which comprises passing a mixture of naphthalene vapor and air in contact with a fluidized catalyst bed maintained at a temperature within the range of about 325°–425° C. and containing a silica-vanadium oxide-potassium sulfate catalyst characterized by a surface area of at least 20 square meters per gram in its freshly prepared condition and produced by adding ammonium vanadate to an aqueous potassium silicate solution, aging the mixture until the resulting hydrated silica is converted into a hydrogel, then adding sufficient sulfuric acid to produce an $SO_3:K_2O$ ratio of about 2:1 and sufficient ammonia to attain a final pH within the range of about 4–9 and drying the product.

10. A method of producing phthalic anhydride which comprises passing a mixture of naphthalene vapor and air in contact with a fluidized catalyst bed maintained at a temperature within the range of about 325°–425° C. and containing a silica-vanadium oxide-potassium sulfate catalyst characterized by a surface area of about 40–75 square meters per gram in its freshly prepared condition and produced by adding to an aqueous potassium silicate solution a quantity of ammonium vanadate such as to incorporate from 5% to 15% of $V_2O_5$ into the catalyst at a temperature within the range of about 120°–200° F., aging the mixture at a temperature within said range until the resulting hydrated silica is converted into a hydrogel, then adding sufficient sulfuric acid to produce an $SO_3:K_2O$ ratio of about 2:1 and sufficient ammonia to attain a final pH within the range of about 4–9 and drying the product.

References Cited in the file of this patent

UNITED STATES PATENTS

| | | |
|---|---|---|
| 2,453,740 | Becker | Nov. 16, 1948 |
| 2,471,853 | Beach | May 31, 1949 |
| 2,674,582 | Darby | Apr. 6, 1954 |
| 2,698,330 | Fugate et al. | Dec. 28, 1954 |
| 2,769,018 | West | Oct. 30, 1956 |
| 2,783,249 | Jaeger et al. | Feb. 26, 1957 |
| 2,809,939 | Dixon | Oct. 15, 1957 |
| 2,863,879 | Tribit | Dec. 9, 1958 |

OTHER REFERENCES

Sherwood: "Petroleum Refiner," vol. 32, pages 113–117 (1953).